Nov. 9, 1954  K. A. LANG  2,694,176
CURRENT CONTROL APPARATUS
Filed April 29, 1950
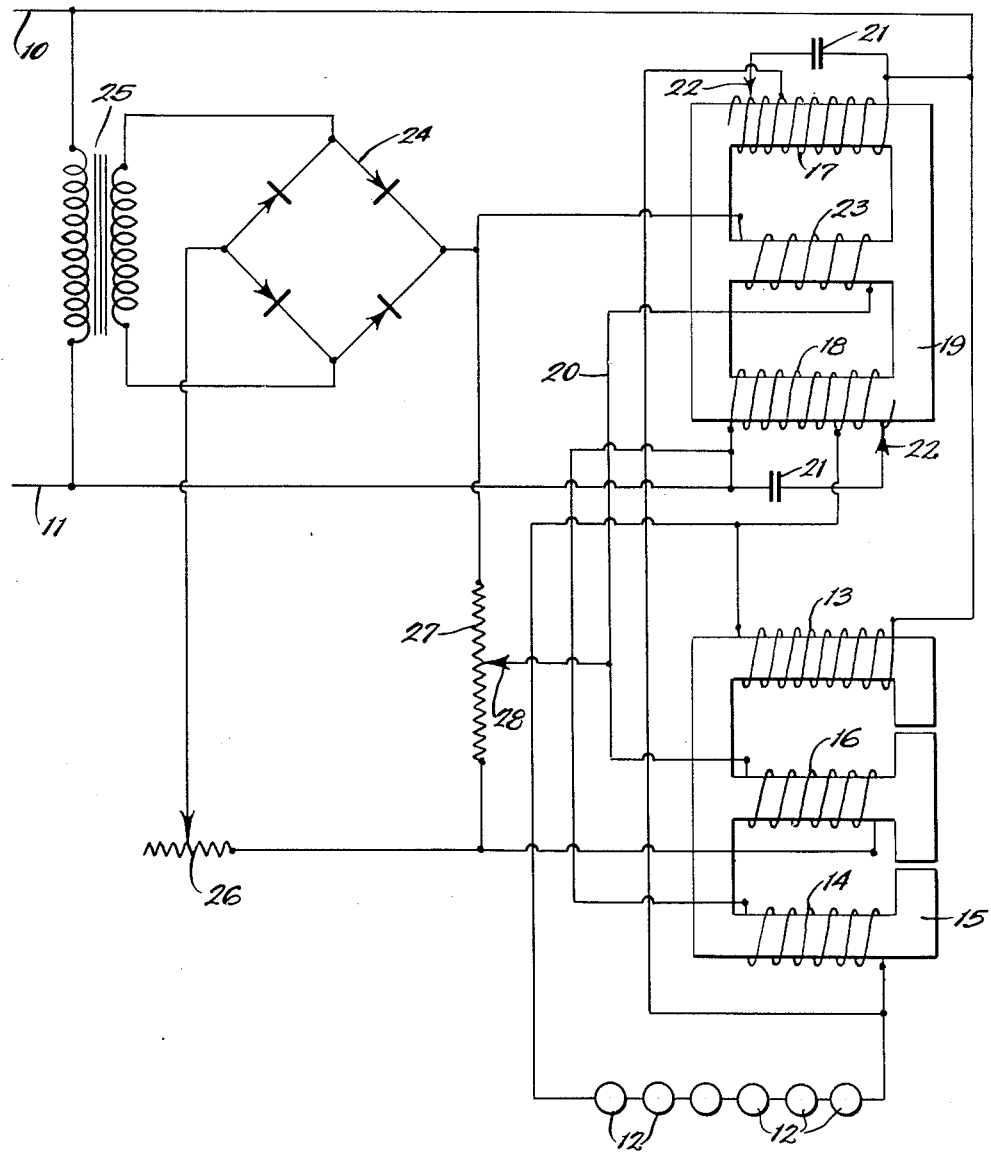
INVENTOR:
Karl A. Lang,
BY Dawson, Ooms, Booth and Spangenberg,
ATTORNEYS.

United States Patent Office 2,694,176
Patented Nov. 9, 1954

2,694,176

CURRENT CONTROL APPARATUS

Karl A. Lang, Glenview, Ill., assignor to Lindberg Engineering Company

Application April 29, 1950, Serial No. 159,045

7 Claims. (Cl. 323—2)

This invention relates to current control apparatus and more particularly to a resonant type constant potential to constant current regulator.

Regulators employing monocyclic squares or similar resonant circuits have been used extensively to supply current to constant current loads. Circuits of this type are sensitive to voltage changes in the source and further cannot be adjusted to any appreciable extent to vary the load current without de-tuning them from resonance, thereby adversely affecting the power factor. In my prior patents Nos. 2,426,937 and 2,471,822 means have been provided to compensate for changes in source voltage and such means are extremely effective for this purpose. However these circuits are capable of extremely limited adjustment to vary the load currents, and it is frequently desirable to effect more substantial adjustments in the load current, as, for example, to vary the brightness of series lamps supplied from the circuits.

It is one of the objects of the present invention to provide a current regulating apparatus in which the load current is capable of appreciable adjustment without throwing the circuit excessively out of resonance.

Another object is to provide a current control apparatus in which the effect of both the capacitative and inductive elements in the resonant circuit is simultaneously varied to vary the load current. Preferably one control is provided to vary the general setting of the circuit and a second control is provided to vary the load current within the limits of the setting.

A specific object is to provide a current control apparatus in which both the inductive and capacitative elements of the circuit include cored windings and in which the control is effected by varying the saturation of the cores.

The above and other objects and advantages of the invention will be more readily apparent from the following description when read in connection with the accompanying drawing in which:

The single figure is a diagrammatic view of a control circuit embodying the invention.

The circuit as illustrated is adapted to control the supply of current from a source including leads 10 and 11 to a load shown as comprising plurality of electric lamps 12 connected in series. The circuit of the present invention provides a simple and convenient means for varying the current supplied to the lamps so that their brightness can easily be controlled to suit existing conditions without throwing the circuit out of balance.

As shown, the circuit comprises a monocyclic square including a pair of inductive windings 13 and 14 wound on a core 15. The core is provided with a central leg carrying a saturating winding 16 by means of which the degree of saturation of the core can be varied.

The capacitative elements of the circuit comprise a pair of windings 17 and 18 wound on a core 19 and inductively coupled through the core. Condensers 21 are connected across the windings 17 and 18 and preferably include adjustable wipers 22 by which the effective number of turns in the windings 17 and 18 can be adjusted. The core 19 is provided with a central leg on which a saturating winding 23 is mounted to vary the saturation of the core.

Saturating current to the windings 16 and 23 is supplied through a full wave rectifier 24 which is connected across the source through a transformer 25. One side of the rectifier as shown is connected directly to one end of the winding 23 and the windings 16 and 23 are connected in series by a wire 20. The winding 16 is connected to the other side of the rectifier through a variable resistor 26, by means of which the range of saturating current can be adjusted.

To vary the saturating currents in the windings 16 and 23 relative to each other, thereby to adjust the load current, a resistor 27 is connected across the rectifier. As shown, the resistor is connected between the outer connections to the saturating windings and is provided with an adjustable wiper 28 which connects to the wire 25. By adjusting the wiper 28, it will be seen that the saturating currents in the windings 16 and 23 are varied inversely relative to each other.

In operation of the circuit the resistor 26 is adjusted to provide the desired maximum saturating current and to establish the range through which the circuit can be adjusted. It will be noted that adjustment of this resistor simultaneously increases or decreases the saturating current in the two windings 16 and 23. If it is desired to vary the load current, the wiper 28 may be adjusted to produce the desired effect. If the load current is to be increased, the wiper 28 may be moved upward, thereby decreasing the portion of the resistor 27 which is in circuit with the winding 16 to increase the saturating current therethrough. Thus the saturation of the core 15 is increased to decrease the inductive effect of the windings 13 and 14 in the circuit.

At the same time a greater portion of the resistor 27 is included in circuit with the winding 23 to decrease the saturating current therethrough, thereby decreasing saturation of the core 19. This increases the inductive effect of the windings 17 and 18, which is subtracted from the capacitative effect of the condensers 21, thereby decreasing the effective capacitance in the circuit. The net result of the simultaneous decrease of the inductive and capacitative effects is to increase the load current.

It will be noted that adjustment of the wiper 28 simultaneously varies the capacitative and inductive effects in the same direction so that the circuit is maintained at or very close to resonance under all conditions of adjustment. Thus the load current can be changed through substantial adjustments without throwing the circuit out of resonance. In this way the power factor is maintained at or near unity under all conditions of adjustment.

While embodiment of the invention has been shown and described in detail, it will be understood that this is illustrative only and is not to be taken as a definition of the scope of the invention, reference being had for this purpose to the appended claims.

What is claimed is:

1. Current control apparatus comprising a pair of inductively coupled windings wound on a common core, a capacitor connected directly across at least one of the windings, a pair of inductive windings on a common core connected in a square circuit with the first named windings to define a monocyclic square opposite corners of which are adapted to be connected to an alternating current supply source and the remaining corners to a load, saturating windings on the cores, means connecting the saturating windings to the supply source to supply variable saturating current thereto in response to the supply source voltage, and control means to vary the saturating currents in the respective saturating windings relative to each other to vary the load current.

2. Current control apparatus comprising a pair of inductively coupled windings wound on a common core, a capacitor connected directly across at least one of the windings, a pair of inductive windings on a common core connected in a square circuit with the first named windings to define a monocyclic square opposite corners of which are adapted to be connected to an alternating current supply source and the remaining corners to a load, saturating windings on the cores, means connecting the saturating windings to the supply source to supply saturation current thereto varying in response to voltage changes in the source, a first variable control device to adjust the currents in the saturating windings simultaneously in the same direction, and a second variable control device to vary the saturating currents in the saturating windings relative to each other.

3. Current control apparatus comprising a pair of inductively coupled windings wound on a common core, a capacitor connected across at least one of the windings, a pair of inductive windings on a common core connected in a square circuit with the first named windings to define a monocyclic square opposite corners of which are adapted to be connected to an alternating current supply source and the remaining corners to a load, saturating windings on the cores, means connecting the saturating windings in series to the supply source to supply saturating current thereto varying in response to voltage changes in the source, an impedance connected across said means, and an adjustable wiper engaging the impedance and connected to a point between the saturating windings to vary the saturating currents relative to each other.

4. Current control apparatus comprising a pair of inductively coupled windings wound on a common core, a capacitor connected across at least one of the windings, a pair of inductive windings on a common core connected in a square circuit with the first named windings to define a monocyclic square opposite corners of which are adapted to be connected to an alternating current supply source and the remaining corners to a load, saturating windings on the cores, means connecting the saturating windings in series to the supply source to supply saturating current thereto varying in response to voltage changes in the source, a variable resistor in series with said means to vary the saturating currents in the windings simultaneously connected across said means, and an adjustable wiper engaging the impedance and connected to a point between the saturating windings.

5. Current control apparatus comprising a pair of inductively coupled windings wound on a common core, a capacitor connected across at least one of the windings, a pair of inductive windings on a common core connected in a square circuit with the first named windings to define a monocyclic square opposite corners of which are adapted to be connected to an alternating current supply source and the remaining corners to a load, saturating windings on the cores, a rectifier connected to the supply source and to the saturating windings to supply saturating current thereto, and control means to vary the currents in the saturating windings relative to each other.

6. Current control apparatus comprising a pair of inductively coupled windings wound on a common core, a capacitor connected across at least one of the windings, a pair of inductive windings on a common core connected in a square circuit with the first named windings to define a monocyclic square opposite corners of which are adapted to be connected to an alternating current supply source and the remaining corners to a load, saturating windings on the cores, a rectifier connected to the supply source and to the saturating windings in series, an impedance connected across the rectifier, and an adjustable wiper engaging the impedance and connected to a point in the circuit between the saturating windings.

7. Current control apparatus comprising a pair of inductively coupled windings wound on a common core, a capacitor connected across at least one of the windings, a pair of inductive windings on a common core connected in a square circuit with the first named windings to define a monocyclic square opposite corners of which are adapted to be connected to an alternating current supply source and the remaining corners to a load, saturating windings on the cores, a rectifier connected to the supply source and to the saturating windings in series, a variable resistor in series between the rectifier and saturating windings simultaneously to vary the saturating current in both saturating windings, a resistor connected across both saturating windings, and an adjustable wiper engaging the last named resistor and connected to a point between the saturating windings to vary the saturating currents relative to each other.

References Cited in the file of this patent

UNITED STATES PATENTS

| Number | Name | Date |
|---|---|---|
| 1,862,203 | Sorensen et al. | June 7, 1932 |
| 2,136,695 | Laing | Nov. 15, 1938 |
| 2,426,937 | Lang | Sept. 2, 1947 |
| 2,456,938 | Harder | Dec. 21, 1948 |